2,999,105
PROCESS FOR PREPARATION OF ESTERS OF
THIOSULFINIC ACIDS
Rector P. Louthan, Bartlesville, Okla., assignor to Phillips Petroleum Company, a corporation of Delaware
No Drawing. Filed May 20, 1957, Ser. No. 660,042
10 Claims. (Cl. 260—453)

This invention relates to the preparation of esters of thiosulfinic acids. In one aspect, this invention relates to a process for the preparation of organic thiosulfinates by the reaction of a sulfenyl halide with an alkali metal hydroxide.

In the past, organic thiosulfinates, having a formula of

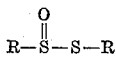

have been prepared by the oxidation of an organic disulfide with an organic per-acid. This prior art process has not been found feasible or adaptable to commercial operation because of the high cost of the organic per-acid and the fire and non-safety hazards incident to the use of an organic per-acid.

I have discovered that organic thiosulfinates of the formula

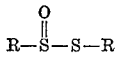

can be formed in high yield by reacting a sulfenyl halide of the formula R—S—X with an alkali metal hydroxide. This reaction is illustrated by the following chemical equation:

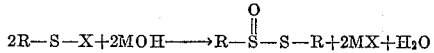

where each R is an alkyl, cycloalkyl or aralkyl radical, X is a halogen, and M is an alkali metal.

An object of this invention is to provide a process for the preparation of organic thiosulfinates in high yield. Another object of this invention is to provide a process for the reaction of a sulfenyl halide with an alkali metal hydroxide to form an organic thiosulfinate. Other aspects, objects and advantages of the invention are apparent from a consideration of the accompanying disclosure and the appended claims.

In accordance with this invention, organic thiosulfinates of the formula

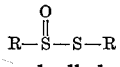

wherein R is an alkyl, cycloalkyl, or aralkyl radical, are prepared in high yield by reacting with an alkali metal hydroxide a sulfenyl halide of the formula R—S—X, wherein R is as defined and X is a halogen. Generally, the number of carbon atoms in the R radical is not restrictive since it is the functional group upon which the reaction depends; however, R preferably contains from 1 to 20 carbon atoms per molecule.

The preparation of sulfenyl halides by halogenation of a mercaptan and/or a disulfide is disclosed in the copending application of Chester M. Himel, Serial No. 387,386, filed October 21, 1953, now U.S. Patent No. 2,934,563.

The reaction of this invention is conducted preferably in liquid phase and any suitable pressure therefor and at any temperature within the range between 0° and 350° F., preferably in the range of 175° to 250° F. As desired, the reaction can be carried out either in the presence or in the absence of a solvent chemically inert to the reactants and product. Advantageously, the reaction is carried out in the presence of a chemically inert solvent, preferably a paraffinic and/or cycloparaffinic hydrocarbon having from 3 to 14 carbon atoms per molecule. It is advantageous to carry out the reaction of the present invention by the addition of the alkali metal hydroxide directly to the sulfenyl halide-solvent reaction mixture recovered from the sulfenyl halide-forming reaction. The thiosulfinates obtained can be recovered by the usual procedures of fractional distillation at reduced pressure, partition between solvents, or fractional crystallization.

The alkali metal hydroxides which can be employed in the process of this invention are the hydroxides of sodium, potassium, lithium, rubidium and cesium. Sodium hydroxide is generally preferred because of its ready commercial availability. Preferably, the alkali metal hydroxide is employed in the form of an aqueous solution having an alkali metal hydroxide concentration in the range of from about 10 percent by weight up to the saturation concentration existing at the particular temperature of the solution. The amount of alkali metal hydroxide maintained in the reaction zone should be at least one molar equivalent of the sulfenyl halide present, preferably 1.0 to 1.5 molar equivalents, although greater amounts, such as 5 molar equivalents, can be used.

The sulfenyl halide, having a formula of R—S—X, reacted with the alkali metal hydroxide by the method of this invention, can be either a chloride, bromide, iodide, or fluoride with the R group being an alkyl, cycloalkyl, or aralkyl radical, as above defined. Exemplary of sulfenyl halides which are reacted with the alkali metal hydroxides referred to hereinabove are methyl sulfenyl chloride, isopropyl sulfenyl bromide, tertiary-butyl sulfenyl chloride, n-hexyl sulfenyl iodide, isooctyl sulfenyl fluoride, cyclohexyl sulfenyl chloride, benzyl sulfenyl bromide, tert-dodecyl sulfenyl chloride, n-tetradecyl sulfenyl fluoride, and 4-cyclohexyl-n-tetradecyl sulfenyl chloride.

As stated, the reaction of this invention is carried out in the presence of an inert solvent, such as a hydrocarbon having from 3 to 14 carbon atoms per molecule or a hydrocarbon fraction containing hydrocarbons having from 3 to 14 carbon atoms per molecule. The normal paraffin, isoparaffin, and cycloparaffin hydrocarbons are very suitable in the practice of this invention. Exemplary of some solvents which can be employed are isopentane, n-hexane, n-heptane, isooctane and cyclohexane. Preferably, the inert solvent has a boiling range within the limits of about 40° to about 400° F. Solvents such as carbon tetrachloride, which react with an alkali metal hydroxide, are not suitable in the practice of this invention even though such solvents are suitable for the formation of the sulfenyl halide by the halogenation of the mercaptan or disulfide as disclosed in the above-identified copending application.

Although reaction time is dependent upon the specific reactants employed and the reaction conditions maintained, the overall reaction time is often in the range from 5 to 180 minutes. The completion of the reaction can be very readily ascertained by one skilled in the art because the reaction mass loses its characteristic reddish-brown sulfenyl halide color as the reaction progresses, until finally, with the completion of the reaction, the sulfenyl halide color disappears completely. Thus, the reaction is complete when the reddish-brown color is no longer evident.

Exemplary of organic thiosulfinate products of this invention are methyl methane thiosulfinate, tertiary-butyl butane thiosulfinate, isopropyl propane thiosulfinate, cyclohexyl cyclohexane thiosulfinate, benzyl phenylmethane thiosulfinate, decyl decane thiosulfinate, n-eicosyl eicosane thiosulfinate, 6-phenyl-n-tetradecyl 6-phenyl-n-tetradecane thiosulfinate, and 4-cyclohexyl-n-teradecyl 4-cyclohexyl-n-tetradecane thiosulfinate.

In accordance with a preferred practice of this invention, a metal hydroxide, preferably sodium hydroxide, in from about 5 to 20 weight percent aqueous solution, is charged into a reaction system containing a sulfenyl halide together with about from 0.25 to 2 volumes of a solvent chemically inert with respect to reactants and product formed, preferably a hydrocarbon having from 3 to 14 carbon atoms per molecule or hydrocarbon fraction containing hydrocarbons having from 3 to 14 carbon atoms per molecule, and the resulting reaction admixture maintained at a temperature, with agitation, within the range of about 0° to 350° F., preferably under refluxing conditions at a pressure, as, for example, at about atmospheric, for a period of time of from about 5 to 180 minutes. Preferably, the amount of alkali metal hydroxide charged to the reaction system is 1.0 to 1.5 molar equivalents of the sulfenyl halide present. Under these conditions, an organic thiosulfinate is formed which may be recovered from the resulting reaction mixture by a suitable method, such as by distillation under reduced pressure in the range of from about 0.05 to 50 mm. Hg.

*Example I*

Tertiary-butyl sulfenyl chloride was prepared by placing 196 grams of di-tertiary-butyl disulfide and 1500 cc. of isopentane in a flask which was fitted with a reflux condenser, flushing the flask with nitrogen to remove all traces of air from the reaction zone, and then bubbling 71 grams of gaseous chlorine into the flask. The temperature was maintained at the boiling point of isopentane during chlorine addition, heat being removed by the reflux condenser. The contents of the flask was stirred during the addition of chlorine and developed the characteristic reddish brown color of an alkyl sulfenyl chloride. The thiosulfinate was prepared by the addition of 80 grams of sodium hydroxide in 300 ml. of water to the sulfenyl chloride solution. The reaction mixture was stirred during the addition of the aqueous sodium hydroxide solution and stirring was continued for 1.5 hours thereafter. The flask was allowed to stand over night after which an additional 80 grams of sodium hydroxide in 100 ml. water was added. Stirring was continued for one hour after this addition. During this one hour period, the exothermic heat of reaction was removed by means of refluxing isopentane. At the end of this time, the reflux condenser was removed from the flask and most of the isopentane solvent was evaporated by heating to 140° F. on a steam bath. The oil phase obtained was then diluted with approximately 500 cc. of n-pentane to effect separation of the phases. The oil phase formed was then fractionally distilled at reduced pressure in the range of 0.2 to 0.9 mm. Hg and the cuts boiling between 169° and 196° F. were combined. This combined material was then recrystallized from isopentane and 34 grams of product recovered. This product had a refractive index $n_D^{20}$ of 1.5032. An element analysis gave the following results:

|   | Found | Calculated for Tert-C$_4$—$\overset{O}{\underset{\|}{S}}$—S—Tert-C$_4$ |
| --- | --- | --- |
|   | *Percent* | *Percent* |
| S | 32.2 | 33.0 |
| C | 49.1 | 49.5 |
| H | 9.29 | 9.3 |
| O | 10.0 | 8.2 |
|   | 100.59 | 100.0 |

An infrared analysis of this material proved tertiary-butyl groups and the $$\overset{O}{\underset{\|}{S}}$$

group to be present.

*Example II*

Tertiary-butyl sulfenyl chloride was prepared in a 3-necked flask, fitted with a stirrer, chlorine bubbler and reflux condenser, by charging 195 grams of di-tertiary-butyl disulfide dissolved in 1500 cc. of n-heptane into the flask, and thereafter bubbling in 71 grams of chlorine over a 10 minute period. The reaction mass was then blown with nitrogen for a few minutes and the temperature of the reaction mass during chlorination was maintained between 77° and 108° F. by means of a cooling bath.

The thiosulfinate was prepared by the addition of 88 grams of 98 weight percent sodium hydroxide dissolved in 300 cc. of water directly to the sulfenyl chloride solution in the flask. The reaction mixture was then heated on a steam bath to the reflux temperature of about 176° F. and maintained at that temperature for one hour with agitation. During this period of time, the color of the sulfenyl chloride solution slowly faded and the solution was almost colorless after about 45 minutes. After this one hour period, an additional 100 cc. of water were added to the flask to dissolve the sodium chloride formed and the solution was then made acid by the addition of a small amount of concentrated hydrochloric acid to neutralize the excess sodium hydroxide present. The phases were then separated and the oil phase obtained was washed twice with water. Thereafter, most of the heptane solvent was stripped off by heating the material to 194° F. on a steam bath and maintaining the system under a vacuum. The distillation was continued, after stripping the solvent, to remove lower boiling materials, principally unreacted disulfide, and this distillation was regarded as being completed when the decomposition of the material in the flask was first observed. The 155 grams of material recovered was further purified by crystallization from isopentane. The amount of material obtained, after recrystallization from isopentane, was 101.6 grams. This material had a refractive index $n_D^{20}$ of 1.5035.

The thiosulfinate products of this invention exhibit special utility as plant defoliants, for example, as defoliants for cotton, beans, and plants of the family Geraniaceae. The thiosulfinate products of this invention also exhibit special utility as bactericides and fungicides. For example, n-butyl butane thiosulfinate is very effective against organisms such as *B.cerus*, *Strep.hemolyticus*, *Staphy.albus*, and *Staph.arueus*.

The foregoing examples specifically illustrate the invention which, as noted, is dependent upon the functional group and not upon the number of carbon atoms in the radicals represented by R. Thus, as earlier noted in the preferred form of the invention, up to and including 20 carbon atoms in the R radicals are operative and even above this number the reaction of the invention is obtained. Indeed, it appears that there is no limit to the number of carbon atoms which can be contained in the said radicals.

Reasonable variation and modification are possible within the scope of the foregoing disclosure and the appended claims to the invention, the essence of which is that a process has been provided for forming organic thiosulfinates by reacting a sulfenyl halide with an alkali metal hydroxide, preferably in the presence of an inert hydrocarbon solvent.

I claim:
1. The process of preparing an organic ester of the thiosulfinic acid having the formula

$$R-\overset{O}{\underset{\|}{S}}-S-R$$

wherein R is selected from the group consisting of alkyl, cycloalkyl, and aralkyl hydrocarbon radicals comprising reacting a sulfenyl halide of the formula R—S—X wherein R is a radical above identified and X is a halogen selected from the group consisting of chlorine, bromine, iodine, and fluorine, with an alkali metal hydroxide, and recovering the thiosulfinate thus formed.

2. A process of claim 1 wherein said reacting is conducted in the presence of a solvent chemically inert under all conditions of said reacting.

3. A process of claim 1 wherein said reacting is conducted in the presence of a hydrocarbon solvent chemically inert under all conditions of said reacting, said hydrocarbon solvent having from 3 to 14 carbon atoms per molecule.

4. The process of claim 3 wherein said alkali metal hydroxide is selected from the group consisting of sodium, potassium, lithium, rubidium, and cesium.

5. The process of preparing an organic ester of thiosulfinic acid having the formula

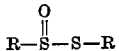

wherein R is selected from the group consisting of alkyl, cycloalkyl, and aralkyl hydrocarbon radicals comprising reacting at least 1.0 molar equivalents of a sulfenyl halide of the formula R—S—X wherein R is a radical above identified and X is a halogen selected from the group consisting of chlorine, bromine, iodine, and fluorine, with an alkali metal hydroxide in aqueous solution selected from the group consisting of sodium, potassium, lithium, rubidium, and cesium in the presence of an inert hydrocarbon solvent at a temperature in the range of 0° to 350° F., and recovering the thiosulfinate thus formed.

6. The process of claim 5 wherein said inert hydrocarbon solvent is selected from the group consisting of isopentane, n-hexane, n-heptane, isooctane, and cyclohexane.

7. The process of claim 5 wherein said reacting is conducted at a temperature in the range of 175° to 250° F.

8. The process of claim 5 wherein said sulfenyl halide is an alkyl sulfenyl chloride and said alkali metal hydroxide is sodium hydroxide.

9. A process comprising reacting an alkyl sulfenyl halide with an alkali metal hydroxide to form an organic thiosulfinate comprising admixing at least one molar equivalent of said alkyl sulfenyl halide dissolved in a hydrocarbon solvent with an alkali metal hydroxide in aqueous solution, maintaining the resulting admixture at a temperature within the range of 0° to 350° F. until the color of said admixture turns from reddish-brown to colorless, separating the two phases formed, and recovering said organic thiosulfinate by distillation.

10. The process of claim 9 wherein said alkyl sulfenyl halide is tert-butyl sulfenyl chloride, said alkali metal hydroxide is sodium hydroxide, and said hydrocarbon solvent is n-heptane.

References Cited in the file of this patent

UNITED STATES PATENTS 2,508,745   Cavallito et al. _____ May 23, 1950

OTHER REFERENCES

Gilman: "Organic Chemistry," 1943, volume 1, second edition, page 921.

Cavallito et al.: J.A.C.S., 67, pages 1032–1033, June 1945.

Small et al.: J.A.C.S., volume 69, 1947, pages 1710–1711.